United States Patent [19]

Swab

[11] Patent Number: 5,102,919

[45] Date of Patent: Apr. 7, 1992

[54] REDUCED SMOKE GENERATING POLYURETHANE/POLYISOCYANURATE FOAMS

[75] Inventor: John Swab, Flat Rock, Mich.

[73] Assignee: BASF Corporation, Parsippany, N.J.

[21] Appl. No.: 740,240

[22] Filed: Aug. 5, 1991

[51] Int. Cl.[5] .............................. C08J 9/02; C08J 9/08
[52] U.S. Cl. .................................... 521/130; 521/155; 521/902
[58] Field of Search ........................ 521/130, 155, 902

[56] References Cited

U.S. PATENT DOCUMENTS 4,588,787  3/1986  Kordomenos et al. ............. 525/440
4,810,759  3/1989  Ryntz ................................... 525/440

Primary Examiner—Morton Foelak
Attorney, Agent, or Firm—Martin P. Connaughton

[57] ABSTRACT

The present invention is related to polyurethane/polyisocyanurate foams containing a mixture of aliphatic dibasic esters, comprising varying amounts of the dimethyl esters of adipic, glutaric, and succinic acids. The foams of the present invention exhibit reduced smoke generating characteristics when compared to the same foam without the dibasic esters.

6 Claims, No Drawings

REDUCED SMOKE GENERATING POLYURETHANE/POLYISOCYANURATE FOAMS

BACKGROUND THE INVENTION

1. Field of the Invention

The present invention relates to reduced smoke generating polyurethane/polyisocyanurate foams (PU/PIR foams) and the process for preparing such foams. Specifically the invention relates to PU/PIR foams having a Class I flame rating containing aliphatic dibasic esters as the smoke reducing agent.

2. Description of the Related Art

A critical factor in large scale commercial acceptance of rigid foams has been the ability to produce foams which exhibit low flame spread and smoke generating characteristics. In order to improve the performance of foams, aromatic polyester polyols have been used in the production of polyurethane foams and urethane modified polyisocyanurate foams. The use of such polyester polyols is described, for example, in U.S. Pat. Nos. 2,246,365 and 4,039,487. U.S. Pat. No. 4,246,365 teaches that the fire resistance of polyisocyanurate foams can be improved by using polyester polyols based on phthalic acid residues. U.S. Pat. No. 4,039,487 teaches a wide variety or aromatic polyester polyols which are said to produce foams With good ASTM E-84 performance.

In an article entitled "The Use of a Unique Aromatic Polyester Polyol in Urethane Modified Isocyanurate Foam Systems" (SRI ANTC, pages 348-351, R. J. Wood, 1983), the use of aromatic polyester polyols combined with various polyethers, solubilizers and relatively low viscosity polyisocyanates is described.

The use of aromatic polyester polyols in combination with sucrose or sucrose-amine based polyethers and low viscosity polyisocyanates is disclosed in U.S. Pat. Nos. 4,459,334 and 4,496,625, and in "New Polyols for Urethane Modified Isocyanurate Foams" (Journal of Cellular Plastics, May-June, 1984, K. B. White et al, pages 215-219). Polyester polyols which are based on aromatic acids, diethylene glycol and propylene glycol are known (See e.g., Technical Data Bulletin-Firemaster PHT 4-diol.)

Polyester polyols which are the reaction products of polyalkylene terephthalate or recycled polyethylene terephthalate (PET) or dimethyl terephthalate (DMT) with various glycols or glycol blends are also known. Such polyols are disclosed in U.S. Pat. Nos. 4,048,104; 4,223,068; 4,100,354; 4,506,090; 4,436,229 and 4,411,949. Systems based on those polyester polyols Which are produced by reacting a polyalkylene terephthalate residue (PET) with glycol (U.S. Pat. No. 4,417,001) and transesterified dimethylterephthalate oxidation residue (U.S. Pat. Nos. 4,237,238; 4,394,286 and 3,647,759) are also known. Polyurethane foams prepared using such polyester polyols exhibit lower flamespread and smoke generation ratings than corresponding foams prepared without such polyols when evaluated in accordance with ASTM E-84.

Urethane modified polyisocyanurate foams made from polyester-containing polyol blends in which the fire retardance performance is acceptable only at a density of about 2 pounds per cubic foot or below are described in U.S. Pat. Nos. 4,521,611; 4,526,908 and 4,544,679.

U.S. Pat. No. 3,637,542 discloses fire-retardant polyurethane foams having reduced smoke levels. The invention comprises incorporating adipic acid into the fire retardant foam formulation as the smoke reducing agent. Similarly, U.S. Pat. No. 3,639,307 describes incorporating fumaric acid into a fire-retardant foam formulation as a smoke reducing agent. U.S. Pat. No. 4,060,173 describes the use of cyclic polycarboxylic acids as smoke reducing agents in polyurethane/polyisocyanurate foams. U.S. Pat. No. 4,797,428 discloses rigid flame resistant polyurethane foams made by reacting an aromatic polyisocyanate with a mixture of 25-75% oligoester and another isocyanate reactive material, wherein the oligoester is the reaction product of a dicarboxylic acid ester or amide and an alkylene oxide. Such foams attain an ASTM-E84 Class I flame rating.

BRIEF SUMMARY OF THE INVENTION

It has been found that a mixture of aliphatic dibasic esters, comprising varying amounts of the dimethylesters of adipic, glutaric, and succinic acids, significantly reduces the amount of smoke generated by a flame retardant polyurethane/polyisocyanurate.

DETAILED DESCRIPTION OF THE INVENTION

It has now been found that flame retardant PU-PIR foam formulations which have as an additive a mixture of aliphatic dibasic esters (DBE), exhibit a significant reduction in smoke generation. The amount of DBE used in the foam is not critical so long as it is present in amounts sufficient to produce the desired reduction in smoke generation in a given formulation. An effective amount of DBE will vary with the formulation.

The polyurethane-polyisocyanurate foams of this invention include virtually any flame retardant foams formed by reacting an organic polyisocyanate with an active hydrogen containing material in the presence of at least one catalyst capable of promoting the isocyanurate trimer and if necessary a catalyst capable of promoting the formation of urethane linkages. It should be understood that the foams of the present invention are not limited exclusively to those polymers containing urethane and isocyanurates but may include polymers containing allophanate, biuret, carbodiimide, oxazolinyl, uretidinedione, and urea linkages. The reactions of isocyanates which lead to these types of linkages are summarized in the *Polyurethanes Handbook*, Gunter Vertel, Ed., Hanser Publishers, Munich, Oct. 1985, in Chapter 2, pages 7-41; and in *Polyurethane Chemistry and Technology*, J. H. Saunders and K. C. Frisch, Interscience Publishers, N.Y., 1963, Chapter 3, pages 63-11.

Thus, the present invention encompasses rigid polyurethane/polyisocyanarate flame resistant foams, as defined by ASTM E-84 comprising;

A an organic aromatic isocyanate,
B. an active hydrogen containing polyol component selected from the group comprising; polyether polyols, polyester polyols and mixtures thereof, wherein at least one of the polyols is an aromatic polyester polyol,
C. a non-reactive flame retardant additive,
D. a catalyst or mixture of co-catalysts capable of promoting isocyanurate linkages,
E. co-blowing agents comprising water and a volatile blowing agent,
F. surfactants,
G. optionally, solubilizers, H. optionally, fillers, pigments, crosslinkers, or chain extenders, and I. an effective smoke reducing amount of a mixture of aliphatic dibasic esters.

The addition of the mixture of aliphatic dibasic esters to the above described formulation significantly retards the formation of smoke in the foams when subjected to a source of combustion, as compared to the same formulation without the dibasic esters.

The organic isocyanates of the present invention are those having a functionality of two or higher, for example, organic diisocyanates, polyisocyanates, or mixtures thereof. The isocyanates of the current invention are those where in the isocyanate groups are aromatically bound. The preparation of these isocyanates are well known to those skilled in the art. An example of the preparation is included in U.S. Pat. No. 3,715,652.

Included among those aromatic isocyanates suitable for the present invention are;

1,2-, 1,3-, and 1,4-phenylene diisocyanates, 2,4- and 2,6-toluene diisocyanate, 2,4,-, 4,4,- and 2,2,-biphenyl diisocyanates, 2,2'-, 2,4'- and 4,4'-diphenylmethane diisocyanates, and polymethylene polyphenylene polyisocyanates (polymeric MDI). The more particularly preferred are the polymeric MDIs.

The active hydrogen containing polyol component of the present invention may be selected from the group comprising; polyether polyols, polyester polyols and mixtures thereof, wherein at least one polyol is an aromatic polyester polyol.

Any suitable polyalkylene polyether polyol may be used such as the polymerization product of an alkylene oxide or of an alkylene oxide with a polyhydric alcohol. Any suitable polyhydric alcohol, including both aliphatic and aromatic, may be used such as glycerol, 1,1,1-trimethylolpropane, 1,1,1-trimethylolethane, hexane-1,2,6-triol, α-methyl glycoside, pentaerythritol, sucrose, and sorbitol. Also included within the term "polyhydric alcohol" are compounds derived from phenol such as 2,2-bis(4-hydroxyphenyl) propane, commonly known as Bisphenol A.

Any suitable polyamine may be used including aromatic polyamines such as methylene dianiline, polyarylenepolyalkylene polyamine (crude methylene dianiline), p-aminoaniline, 1,5-diaminonaphthalene, and 2,4-diaminotoluene; aliphatic polyamines such as ethylenediamine, 1,3-butylenediamine, as well as substituted secondary derivatives thereof.

Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as tyrene oxide. The polyalkylene polyether polyols may have either primary or secondary hydroxyl groups and, preferably, are polyethers prepared from alkylene oxides having from two to six carbon atoms such as polyethylene polyether glycols, polypropylene polyether glycols, and polybutylene polyether glycols. The polyalkylene polyether polyols may be prepared by any known process such as, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Alkylene oxide adducts of Mannich condensation products are also useful in the invention.

In addition to the above hydroxyl-containing compounds, other compounds which may be employed include graft polyols. These polyols are prepared by the in-situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps at 10% polymer concentration.

A more comprehensive discussion of the graft polyols and their method of preparation can be found in U.S. Pat. Nos. 3,383,351; 3,304,273; 3,652,630; and 3,823,201, 3,953,393, and RE 33,291, the disclosures of which are hereby incorporated by reference.

In a preferred embodiment of the present invention, mixtures of active hydrogen containing polyether polyols and aromatic polyester polyols are used, but the active hydrogen source may consist solely of aromatic polyesters.

A class of suitable aromatic polyesters commercially available are those esters produced by esterifying phthalic acid or phthalic acid anhydride with an aliphatic polyhydric alcohol. Another class of aromatic polyester polyols which is commercially available comprises esters produced by digesting dimethyl terephalate with a diol, triol or an alcohol having a functionality greater than two. Examples of methods of producing suitable polyesters includes U.S. Pat. Nos. 4,048,104; 3,488,298; s907,868; 3,701,741; 3,703,488; 3,776,945; 3,647,759; and 4,237,238. An example of a suitable polyester would be TERATE® 203 available commercially from Cape Industries.

Included in the above class of aromatic polyesters are those having halogen substitution on the aromatic ring. An example of such a product is PHT 4-DIOL, tetrabromophthalate diol available commercially from Great Lakes Chemical Corporation.

Non-reactive, flame retardant agents such as the known phosphate flame retardants may be employed in the present invention. An example of such a flame retardant if FYROL® PCF available commercially from Akzo Chemicals, Inc.

Any known catalyst for the reaction of isocyanate groups with active hydrogens may be used in the present invention. Such catalyst, if necessary, may be used in combination with catalysts for the isocyanurate ring formation to produce foams in accordance with the present invention. Any catalyst which is capable of catalyzing the simultaneous urethane and isocyanurate reactions may also be used. Trimer catalysts, such as, DABCO®T-45 or FOMREZ®EC686 (Potassium Octoate in glycol) admixed with an amine containing cocatalyst such as, CURITHANE® 97 are preferred catalysts.

The blowing agent used in the present invention is not critical. Halogenated organic blowing agents are customarily used. Preferred blowing agents are a mixture of water and halogenated hydrocarbon such as, Freon® FIIA commercially available from DuPont.

Generally surfactants are necessary for the production of the high quality foams of the present invention. Any surfactant known to those skilled in the art may be used. The preferred surfactants are those polyoxyalkylene polyether polysiloxanes, such as, DC-193 available from the Dow Corning Corporation, or TEGOS-TAB ® B-8404 from Goldschmidt Chemical Company.

If necessary the formulation may employ known compatiblizers, such as the oxylkylated alkyl substituted phenols. The formulation may include other additives and auxiliaries commonly used in polyurethane/polyisocyanurate foam formulations. These include crosslinkers, chain extenders, fillers, flame retardants, pigments and the like. Many such additives are discussed in the *Polyurethane Handbook*, Chapter 3, §3.4, [pages 90–109; and in *Polyurethane Chemistry and Technology*, Part II.

The aliphatic dibasic esters used in the present invention are mixtures of the refined dimethylesters of adipic, glutaric, and succinic acids. The dibasic esters of the present invention are manufactured from a mixed acid co-product stream. The ester content in the mixture may be varied to meet a specific need. These aliphatic ester mixtures are available commercially from DuPont. Although any of the ester mixtures are suitable for use in the present invention DBE-5 is the preferred dibasic In accordance with the present invention the isocyanate and isocyanate reactive components may be reacted together by any suitable means known to those skilled in the art. Examples of such processes are described in *Polyurethane Handbook*, Chapter 4, pages 117–160; and in *Polyurethanes: Chemistry and Technology*, Part II, Technology, in Chapter VII, §§ III and IV, pages 7–116 and Chapter VIII, §§ III and IV, pages 201–238.

The following are examples of a process and product of the present invention; they are not intended to set forth the exclusive embodiment or limit the scope of said invention.

Polyol A is a mixed sucrose-dipropylene glycol initiated-polyoxpropylene polyol having an average functionality of about 6.5 and a nominal molecular weight of about 620.

Polyol B is a toluenediamine initiated polyoxyethylene polyol having an average functionality of about 4.0 and a nominal molecular weight of about 495.

PHT 4-Diol is tetrabromophthalate diol having a molecular weight of about 520 and a hydroxyl of about 215. It is available commercially from Great Lakes Chemical Corporation.

TERATE ® 203 is a dimethylterephthalate residue having an average molecular weight of 400 and hydroxyl number range from 300–335. It is available commercially from Cape Industries.

FYROL ® PCF is 2-propanol, 1-chloro-, phosphate (3:1) (8CI, 9CI) used as a flame retardant available commercially from Akzo Chemicals, Inc.

Solublizer A is an alkylphenol initiated polyoxyethylene polyol available commercially from BASF Corporation.

Solubilizer B is an alkylphenol initiated polyoxypropylene polyol available commercially from Union Carbide.

DBE-5 is a dibasic ester fractionate comprised of 99 wt. % dimethyl glutarate and minor amounts of dimethyl succinate and dimethyl adipate.

L-5420 is a silicone containing surfactant available commercially from Union Carbide.

DC-193 is a silicone containing surfactant available commercially from Dow Chemical Co.

B-8404 is a silicone containing surfactant available commercially from Goldschmidt Chemical Company Freon F11A is the DuPont tradename for trichlorofluoro methane.

DABCO T-45 is a trimer catalyst (potassium octoate in glycol) available from Air Products.

Fomrez EC686 is a trimer catalyst (potassium octoate in glycol) available from Witco Chem Co.

Curithane 97 is a trimer co-catalyst (blend of amines in glycol) available from Air Products.

M20S is a polymeric isocyanate having an NCO content of 31.8 weight percent and a viscosity 195 cps at 25° C.

EXAMPLES 1–4

Examples 1–4 were processed through a machine head (type PU-150 sold by Elastogran Maschinenbau) at 70°–85° F. and about 100–200 pounds per minute output. The resin/isocyanate mix was shot into a preheated metal panel mold at about 110° C.–120° C. The foam was allowed to rise and cure. The finished panels were submitted to Underwriters Laboratories, Northbrook, Ill. for testing. The formulations and results are summarized in Table I.

TABLE I

|  | Formulation | | | |
|---|---|---|---|---|
|  | 1 | 2 | 3 | 4 |
| Polyol A | 16.81 | 16.67 | 16.67 | 16.80 |
| Polyol B |  | 6.00 | 5.60 | |
| PHT-4diol | 27.11 | 27.33 | 27.33 | 27.00 |
| TERATE ® 203 | 56.08 | 56.00 | 50.00 | 50.60 |
| FYROL ® PCF | 10.08 | 13.33 | 16.67 | 20.00 |
| Solublizer A | 9.58 | 17.33 | 22.67 | |
| Solublizer B |  |  |  | 25.00 |
| DBE-5 |  |  |  | 6.00 |
| L-5420 | 1.69 |  |  | |
| DC-193 |  | 1.93 | 1.93 | |
| B-8404 |  |  |  | 1.90 |
| DABCO ® T-45 | 1.11 |  |  | |
| FOMREZ ® EC686 |  | 1.33 | 1.38 | 1.08 |
| CURITHANE ® 97 | 1.96 | 2.27 | 2.48 | 3.50 |
| Water | 0.51 | 0.64 | 0.64 | 0.72 |
| FREON ® F11A | 43.69 | 52.67 | 52.67 | 53.00 |
| Resin/ISO (M20S) | 100/100 | 113/100 | 113/100 | 113/100 |
| Cream Time, Sec. | 16.0 | 18.0 | 16.0 | 19.0 |
| String Gel Time, Sec. | 73.0 | 62.0 | 58.0 | 68.0 |
| Tack Free Time, Sec. | 93.0 | 91.0 | 85.0 | 95.0 |
| Density, pcf | 1.86 | 1.53 | 1.70 | 2.0 |
| Density, pcf (molded) | 2.3 | 2.2 | 2.3 | 2.3 |
| % Pack | 23.7 | 43.8 | 29.4 | 15.0 |
| RESULTS | | | | |
| Butler Chimney: | | | | |
| % Wt. Retained | 90.20 | 88.90 | 89.90 | 84.10 |
| SX Time | 10.00 | 10.00 | 10.00 | 10.00 |
| Flame Ht., cm | 14.70 | 16.00 | 15.30 | 17.30 |
| NBS Smoke: | | | | |
| Time to 75% Transmittance | 13.00 | 17.00 | 15.00 | 15.00 |
| Max. Density | 187.00 | 137.00 | 169.00 | 140.00 |
| E-84 Tunnel Test: | | | | |
| Flame Spread | 20.50 | 23.00 | 23.00 | 23.00 |
| Smoke Developed | 309.00 | 348.00 | 341.00 | 178.00 |

As can be seen in the result section of Table I, Examples 1–4 all qualify for the Class I type of foam rating under ASTM E-84, i.e. have a flame spread of 25 or less and smoke development of 450 or less. Such foams have commercial application as insulation in the construction and refrigeration industries. It is apparent that the addition of the aliphatic dibasic ester in example 4 has significantly lowered the smoke development characteristic without effecting the reactivity or flammability characteristics of the foam.

Having thus described the present invention, I claim exclusive right an privilege in:

1. A rigid polyurethane/polyisocyanurate flame resistant foam, comprising;
   A. An organic aromatic isocyanate,
   B. an active hydrogen containing polyol component selected from the group comprising; polyether polyols, polyester polyols and mixtures thereof, wherein at least one of the polyols is an aromatic polyester polyol,
   C. a nonreactive flame retardant compound,
   D. a catalyst or mixture of catalysts capable of promoting isocyanurate linkages,
   E. co-blowing agents comprising water and a volatile blowing agent,
   F. a surfactant,
   G. optionally solublizers,
   H. optionally fillers, pigments, crosslinkers or chain extenders, and
   I. an effective smoke reducing amount of a mixture of dimethylesters of adipic acid, glutaric acid, and succinic acid;
   wherein said rigid polyurethane/polyisocyanurate foams containing said dimethyl esters exhibit reduced smoke generation when compared to the same formulation without said dimethylesters.

2. The composition of claim 1 wherein the organic aromatic isocyanate is a polymethylene polyphenylene polyisocyanate.

3. The composition of claim 1 wherein said dimethylester is a mixture of esters comprising; 99 weight percent dimethyl succinate, and minor or amounts of dimethyl adipate and dimethyl glutarate.

4. A process for the preparation of a polyurethane/polyisocyanurate flame resistant foam, exhibiting reduced smoke generating characteristics, comprising reacting;
   A. an organic aromatic isocyanate, with
   B. a resin component comprising;
      i. an active hydrogen containing polyol component selected from the group comprising, a polyether polyols, polyester polyols, and mixtures thereof, wherein at least one of the polyols is an aromatic polyester polyol,
      ii. a nonreactive flame retardant compound,
      iii. a catalyst or mixture of catalysts capable of promoting isocyanurate linkages,
      iv. co-blowing agents comprising water and a volatile blowing agent,
      v. Surfactants,
      vi. optionally solublizers,
      vii. optionally fillers, pigments, and crosslinkers or chain extenders;
      in the presence of a mixture of dimethyl esters of adipic acid, glutaric acid, and succinic acid.

5. The process of claim 4, wherein the organic aromatic isocyanate is a polymethylene polyphenylene polyisocyanate having an isocyanate content of about 31.8 weight percent and a viscosity of 195° at 25° C.

6. The process of claim 4 wherein said dimethylester is a mixture of esters comprising; 99 weight percent dimethyl succinate and minor amounts dimethyl adipate, and minor amounts and dimethyl glutarate.

* * * * *